April 14, 1936.  R. RECHNITZER  2,037,267
POWER SUPPLY NETWORK FOR THERMIONIC TUBES
Filed July 9, 1932
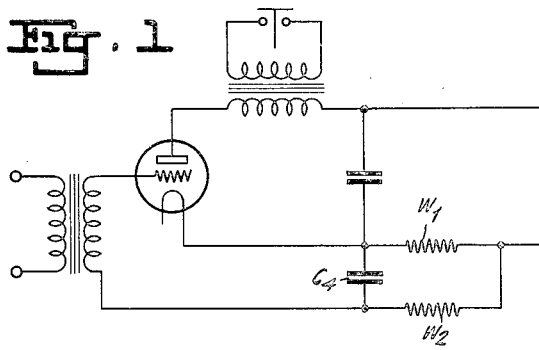
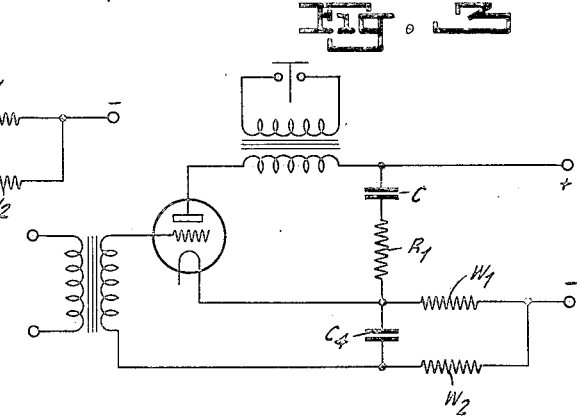
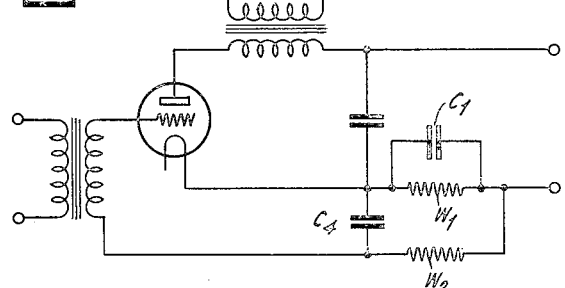
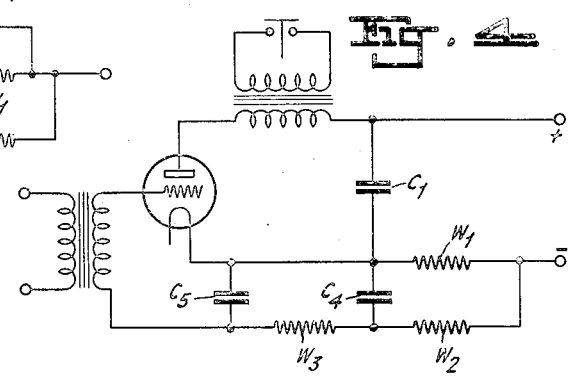
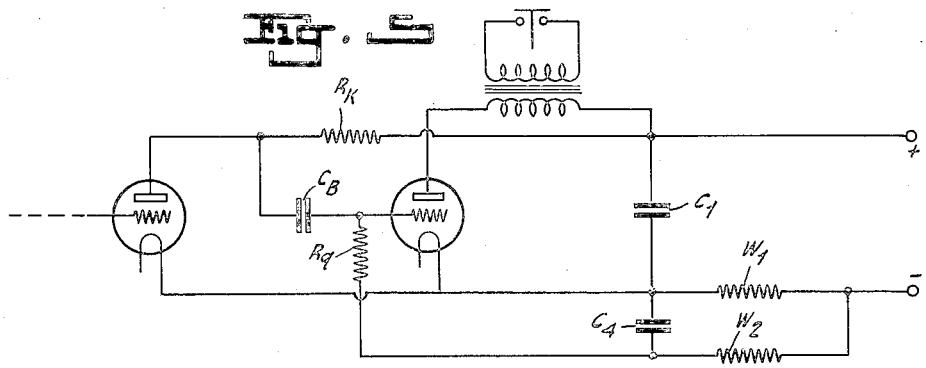
INVENTOR
RUDOLF RECHNITZER
BY /H.S. Grover/
ATTORNEY Patented Apr. 14, 1936

2,037,267

UNITED STATES PATENT OFFICE 2,037,267

POWER SUPPLY NETWORK FOR THERMIONIC TUBES

Rudolf Rechnitzer, Berlin, Germany, assignor to Telefunken Gesellschaft für Drahtlose Telegraphie m. b. H., Berlin, Germany, a corporation of Germany Application July 9, 1932, Serial No. 621,595
In Germany July 10, 1931

4 Claims. (Cl. 250—27)

This invention relates to improvements in applicant's copending application Serial No. 365,843, filed May 25, 1929, Patent No. 2,000,986, May 14, 1935.

Fig. 1 is a circuit arrangement including an amplifier and power supply network therefor.

Fig. 2 illustrates an embodiment of the invention including means for obtaining a phase difference between grid and plate potential variations.

Figs. 3 to 5 are modifications of Fig. 2.

In said copending application, a circuit arrangement insuring network supply for an amplifier tube has been disclosed in which the voltage variations fed to the plate are compensated by an A. C. potential impressed upon the grid, the grid biasing potential being derived (tapped) from a resistance $W_1$ (Fig. 1) traversed by the plate current in parallel relation to which is provided another resistance $W_2$ and the shunt condenser $C_4$ to the filament point. According to the invention disclosed in the parent patent the sizes of $W_1$, $W_2$, $C_4$ are so chosen that if the potential drop across the resistance $W_1$ caused by the plate current has a value suitable for the operation of the tube also the A. C. fed to the grid has a value adapted to compensate the plate variation. But in the scheme disclosed in the parent patent it is difficult to secure ideal compensation of the plate variations by corresponding grid variations, for it is not feasible to obtain the requisite phase angle of 180 degrees between the disturbing plate potential and the compensating potential supplied to the grid by the use of only one resistance-capacity chain $W_2$, $C_4$.

According to the invention, the circuit scheme is provided with such supplemental impedances that the phase difference between the plate potential causative of the trouble and the plate A. C. arising in the tapped $W_2$ will be less than 90 degrees. This is accomplishable in this manner that the resistance $W_1$ (Fig. 2) is shunted by a capacity $C'$. It will then not be necessary to obtain by the resistance-capacity chain $W_2$, $C_4$ a phase displacement angle in the tapped A. C. potential of fully 90 degrees. In fact, all that is required of the filter chain is that the phase angle existing between the disturbing plate potential and the A. C. potential arising across the resistance should be compensated, whereas the phase shift of 180 degrees which must exist in the tube between grid and plate A. C. potential is governed alone by the sense in which the potential is derived at the resistance.

Another embodiment of the invention is illustrated in Fig. 3 in which in series with the condenser $C$ paralleled to the filament-plate circuit of the tube, there is provided a suitably dimensioned resistance $R_1$.

The system of the copending application may also be improved by that the compensatory potentials are fed to the grid electrode from the condenser $C_4$ by way of another resistance-capacity chain $W_3$, $C_5$ (see Fig. 4), the dimensions of the units of the chain $W_2$, $C_4$, $W_3$, $C_5$ being so chosen that compensation of the plate potential variations will be obtained. With this end in view, for instance, the two units or meshes of the filter chain could be made of like dimensions so that each chain occasions a phase shift in the potential of ca 45 degrees, with the result that the same conjointly compensate the shift caused by the series connection of the condenser $C_1$ where the troublesome potentials of the tube arise and the resistance $W_1$.

In case the connection of a resistance-coupled tube is concerned as shown in Fig. 5 where $R_K$ the coupling resistance of the plate circuit of the preceding tube, and $C_B$ the blocking condenser provided between the plate resistance of the preceding tube and the grid leak of the next tube, then the second filter chain may be dispensed with. In this instance the second mesh of the filter is formed by the blocking condenser $C_B$ as well as the resistances $R_K$ and the grid leak $R_g$; and in choosing the dimensions of all of the elements comprised in the circuit scheme the size of these coupling elements must be taken into consideration so that the A. C. potential impressed upon the grid electrode will be displaced an angle of 180 degrees in reference to the disturbing plate potential.

I claim:

1. In a power supply system adapted to be used in connection with relay apparatus including at least one thermionic tube having anode, cathode and grid electrodes, the combination of a source of pulsating direct current, a coupling circuit, including a current smoothing impedance, for connecting the source and the thermionic tube to thereby supply space current to said tube, said impedance being insufficient to completely suppress the ripple component of said direct current whereby the relay output has superimposed thereon an undesired ripple current component due to said incomplete filtration, means for utilizing a potential derived from said filter impedance for determining the potential of a grid electrode of said tube with respect to the cathode thereof, said derived potential also containing a similar undesired ripple component whereby the effect of said ripple component is also present in said relay output and means comprising a phase shifting device associated with said coupling circuit for adjusting the phase of said last named undesired ripple component with respect to the other so that the effects of said components are opposed in said relay output said phase shifting device comprising a capacitive element shunted across said impedance.

2. In a power supply system for relay apparatus including at least one thermionic tube having anode, cathode and grid electrodes, the combination of a source of pulsating direct current, a coupling circuit comprising a filter unit composed of shunted condensers and a series reactor for connecting the source and the thermionic tube to thereby supply space current to said tube said filter unit being insufficient to completely suppress the ripple component of said direct current whereby the relay output contains an undesired ripple current component, means for utilizing a potential derived from the drop across said filter reactor due to the flow of space current therethrough for determining the potential of a grid electrode of said tube with respect to the cathode thereof said reactor being included in a connection between the grid electrode and the cathode, said derived potential also containing a similar undesired ripple component due to said incomplete filtration whereby the effect of said ripple component is also impressed on the relay output, and means comprising a phase shifting device associated with said coupling circuit for shifting the phase of one of said undesired ripple components with respect to the other thereof so that the effects of said components are opposed in said relay output, said phase shifting device comprising a plurality of condensers shunted between the grid electrode and the cathode of said thermionic tube and at least two impedances connected in series with said reactor in said circuit connecting the grid electrode and the cathode.

3. In a power supply system adapted to be used with relay apparatus in combination, a pair of thermionic tubes each thereof provided with anode, cathode and grid electrodes, means for resistively coupling the output of one of said tubes to the input of the other thereof, a source of pulsating direct current, a coupling circuit including a filter reactance for connecting said source to each of said thermionic tubes and to thereby supply space current to each of said tubes, said filter reactor being insufficient to completely suppress the ripple component of said direct current whereby the relay output contains an undesired ripple current component, means for utilizing a potential derived from said filter impedance for determining the potential of a grid electrode of said second named tube with respect to the cathode thereof, said derived potential also containing an undesired ripple component whereby the effect of said ripple component is also present in said relay output and means comprising a phase shifting device associated with said coupling circuit for shifting the phase of one of said undesired ripple components with respect to the other so that the effects of said components are opposed in said relay output said phase shifting device including at least one of the elements utilized to resistively couple the output of the first named tube to the input of the second thereof.

4. In a power supply system for relay apparatus including at least one thermionic tube having anode, cathode and grid electrodes, the combination of a source of pulsating direct current, a coupling circuit comprising a filter unit composed of shunted condensers and a series reactor for connecting the source and the thermionic tube to thereby supply space current to said tube, said filter unit being insufficient to completely suppress the ripple component of said direct current whereby the relay output contains an undesired ripple current component, means for utilizing a potential derived from the drop across said filter reactor due to the flow of current therethrough for determining the potential of a grid electrode of said tube with respect to the cathode thereof, said reactor being included in a connection between the grid electrode and the cathode, said derived potential also containing an undesired ripple component due to said incomplete filtration whereby the effect of said ripple component is also impressed on the relay output, and means comprising a phase shifting device associated with said coupling circuit and connected between the grid electrode and the cathode of said tube for adjusting the phase of one of said undesired ripple components with respect to the other thereof so that the effects of said components are opposed in said relay output to the extent that substantially complete neutralization of the ripple current components in the output circuit is obtained, said phase shifting device comprising at least one condenser shunted between the grid electrode and the cathode of said tube, and an impedance device connected in series with said filter reactor in the said circuit connecting the grid electrode and the cathode.

RUDOLF RECHNITZER.